(12) United States Patent
Vogel et al.

(10) Patent No.: US 11,156,248 B2
(45) Date of Patent: Oct. 26, 2021

(54) THREAD-FORMING SCREW

(71) Applicant: Arnold Umformtechnik GmbH & Co. KG, Forchtenberg-Ernsbach (DE)

(72) Inventors: Georg Vogel, Ingelfingen-Eberstal (DE); Jan Büchle, Pfedelbach (DE)

(73) Assignee: Arnold Umformtechnik GmbH & Co. KG

( * ) Notice: Subject to any disclaimer, the term of this patent is extended or adjusted under 35 U.S.C. 154(b) by 205 days.

(21) Appl. No.: 15/775,472

(22) PCT Filed: Nov. 8, 2016

(86) PCT No.: PCT/EP2016/076941
§ 371 (c)(1),
(2) Date: May 11, 2018

(87) PCT Pub. No.: WO2017/080983
PCT Pub. Date: May 18, 2017

(65) Prior Publication Data
US 2018/0355903 A1    Dec. 13, 2018

(30) Foreign Application Priority Data

Nov. 12, 2015   (DE) .......................... 102015222281.0

(51) Int. Cl.
F16B 35/02    (2006.01)
F16B 25/00    (2006.01)
F16B 25/10    (2006.01)

(52) U.S. Cl.
CPC ...... *F16B 25/0021* (2013.01); *F16B 25/0057* (2013.01); *F16B 25/0078* (2013.01); *F16B 25/0084* (2013.01); *F16B 25/106* (2013.01)

(58) Field of Classification Search
CPC .............. F16B 25/0021; F16B 25/0057; F16B 25/0078; F16B 25/106
USPC .................................................. 411/386, 412
See application file for complete search history.

(56) References Cited

U.S. PATENT DOCUMENTS

| | | | | |
|---|---|---|---|---|
| 2,263,137 A | * | 11/1941 | Oestereicher | ........... F16B 15/06 411/413 |
| 3,195,156 A | | 7/1965 | Phipard, Jr. | |
| 3,438,299 A | * | 4/1969 | Gutshall | ................. F16B 25/10 411/387.2 |
| 4,749,322 A | * | 6/1988 | Sygnator | ................... F16B 5/02 411/387.3 |
| 5,273,383 A | * | 12/1993 | Hughes | ............... F16B 25/0015 411/180 |

(Continued)

FOREIGN PATENT DOCUMENTS

| | | |
|---|---|---|
| AU | 2007278468 A1 | 1/2008 |
| CN | 201265581 | 7/2009 |

(Continued)

OTHER PUBLICATIONS

Chinese Office Action dated Mar. 19, 2019; 7 pages.

*Primary Examiner* — Gary W Estremsky
(74) *Attorney, Agent, or Firm* — Boyle Fredrickson, S.C.

(57) ABSTRACT

A thread-forming screw which is provided in particular for thin, perforated sheet metal contains a threaded shank which below the screw head is initially configured so as to be cylindrical and then continues to a conical forming portion. The screw shank within the forming portion has a rib forming an incomplete counter thread.

11 Claims, 3 Drawing Sheets

(56) References Cited

U.S. PATENT DOCUMENTS

| | | | | |
|---|---|---|---|---|
| 5,361,478 A | * | 11/1994 | Grossberndt | B21J 5/066 |
| | | | | 29/432.2 |
| 5,827,030 A | | 10/1998 | Dicke | |
| 5,895,187 A | * | 4/1999 | Kuo-Tai | F16B 25/0073 |
| | | | | 411/386 |
| 6,494,656 B1 | * | 12/2002 | Boyer | B21H 3/027 |
| | | | | 411/399 |
| 2003/0210970 A1 | * | 11/2003 | Bechtel, Jr. | B21K 1/56 |
| | | | | 411/411 |
| 2003/0235483 A1 | * | 12/2003 | Chen | F16B 25/0073 |
| | | | | 411/387.7 |
| 2008/0118330 A1 | | 5/2008 | Stiebitz et al. | |
| 2008/0286072 A1 | * | 11/2008 | Stiebitz | F16B 25/0073 |
| | | | | 411/387.5 |
| 2009/0311075 A1 | | 12/2009 | Achenbach et al. | |
| 2011/0289752 A1 | | 12/2011 | Werthwein | |
| 2013/0039720 A1 | | 2/2013 | Shih | |
| 2013/0047414 A1 | | 2/2013 | Werthwein | |

FOREIGN PATENT DOCUMENTS

| | | |
|---|---|---|
| DE | 1400229 | 12/1969 |
| DE | 3909725 C1 | 1/1997 |
| DE | 19525732 A1 | 1/1997 |
| DE | 29801813 U1 | 3/1998 |
| DE | 102006034583 A1 | 1/2008 |
| DE | 102006034585 A1 | 1/2008 |
| DE | 102007024240 A1 | 11/2008 |
| DE | 102008033509 A1 | 1/2010 |
| DE | 102010000702 A1 | 7/2011 |
| EP | 0761992 A1 | 3/1997 |
| EP | 0939235 A1 | 1/1999 |
| EP | 1925828 A2 | 5/2008 |
| GN | 201425048 | 3/2010 |

* cited by examiner

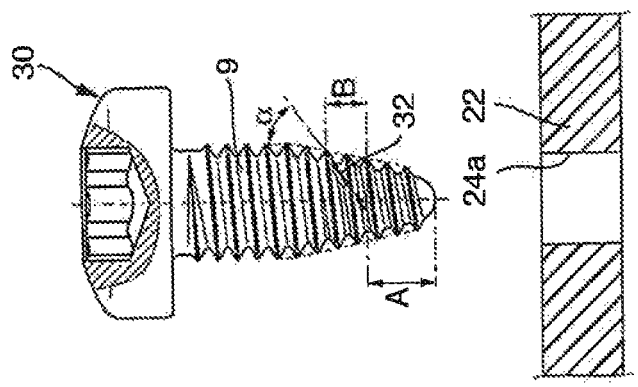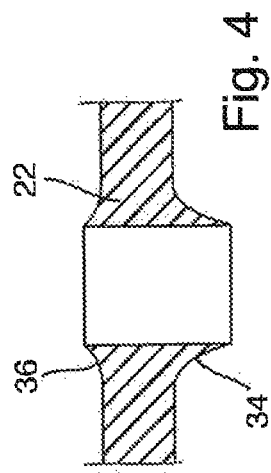
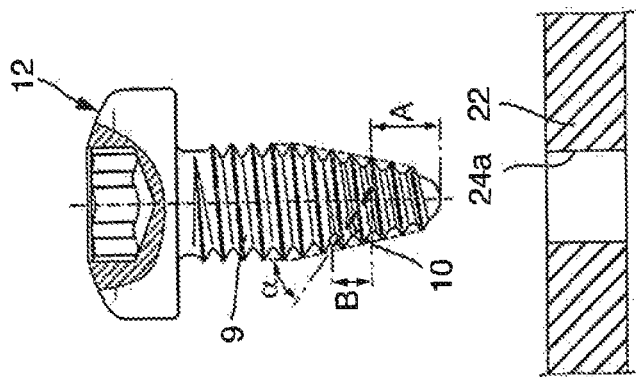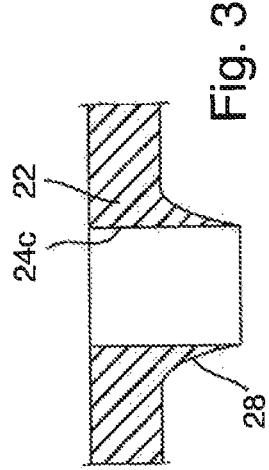
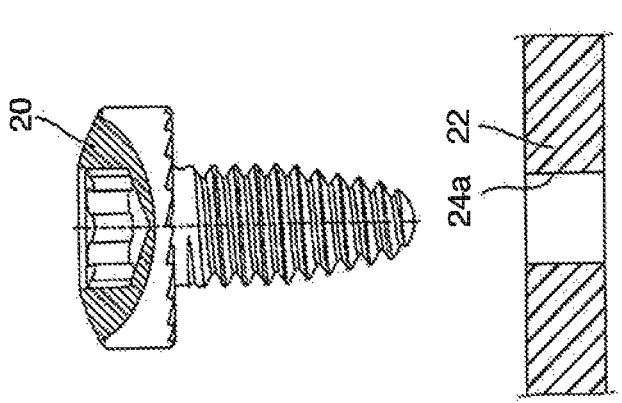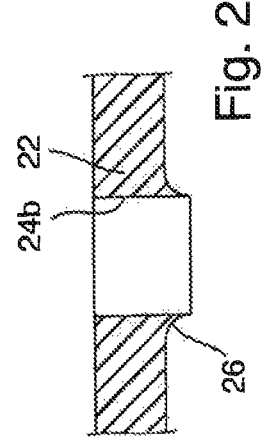
Fig. 2  Fig. 3  Fig. 4

THREAD-FORMING SCREW

BACKGROUND

The invention proceeds from a thread-forming screw.

In many cases, screws are used at assembly points where the bore for attaching the screw is not yet present. In order for the separate production of the bore to be simplified, screws which at the front end thereof have a cutting bit have been developed, so that the bore can be produced by way of the screw per se. The screw then subsequently also cuts the thread in the self-produced bore. Such screws are expedient when the chips arising from the process can either be removed or do not interfere.

In order for the production of the bore and the forming of the thread to be facilitated even where chips are interfering, there are screws which produce the bore into which said screws are screwed by forming. This possibility is of interest above all in the case of sheet metals, in particular thin sheet metals. The bore is produced by the friction heat that is created in the rotation of the screw and softens the sheet metal. A passage protrusion is simultaneously created herein.

In the case of a known screw of this type it is provided that the front end of the screw shank that faces away from the screw head is smooth, thus configured without a thread, and has a rounded tip. The length of the thread-free shank portion is greater than the part of the shank that is provided with a thread. The shank in the smooth portion can have a rounded quadrangular cross section (DE 3909 725 C1).

In a further bore-forming and thread-forming screw a front smooth portion which in terms of the diameter thereof increases from the front end and which ends in a flat end face is likewise provided. The smooth portion can have rounded ribs which run in the manner of a thread (DE 10 2006 034 583 A1).

In the case of a similar screw, an additional spherical tip is attached to the front blunt end of the thread-free smooth portion (DE 10 2006 034 585 A1).

In a yet further thread-forming screw a front thread-free forming portion is likewise provided, the cross-section of the latter decreasing in the direction toward the rounded screw tip. The cross-section of the thread-free forming portion herein is trilobular (DE 10 2008 033 509 A1, DE 10 2010 000 702 A1).

Furthermore known is a screw connection having a screw which has a thread-free tip having the basic shape of a bulging cone which on four sides is flat, in such a manner that the flattenings form edges therebetween (DE 298 01813 U1).

It is a common feature of all these known solutions that the latter penetrate the sheet metal that by way of the friction heat has been rendered plastic, and in the case of the widening of the bore once produced provide a comparatively long thread-free and thus smooth portion that widens. Further measures consist of the arrangement of ribs or edges which run in the axial direction and which are more or less pronounced, and of a variation of the longitudinal profile which can be concave or convex.

There are, however, also applications in which a bore into which a screw which forms its own thread is to be screwed is already present in a sheet metal element. Specifically in the case of very thin sheet metal there is however now the difficulty that the sheet metal is too thin in order for a sufficient holding force, or resistance to overdriving a screw, respectively, to be achieved. When a screw is driven in using a screwdriver, the torque is abruptly increased shortly before the screw head stops, such that a high resistance to overdriving the screw is required here.

BRIEF SUMMARY

The invention is based on the object of achieving a thread-forming screw which also has a sufficient holding and resistance to overwinding even in the case of thin sheet metal.

In order for this object to be achieved, the invention proposes a screw having the features mentioned in claim 1. Refinements of the invention are the subject matter of dependent claims.

While the known screws which are largely used in the case of non-perforated sheet metal use a smooth thread-free portion in order for the bore to be widened, the thread in the case of the screw proposed by the invention, said screw being primarily provided for perforated sheet metal, is configured continuously to the front, optionally rounded, screw end. The shank of the screw has a front forming portion in which the cross section of the shank decreases, in particular continuously, in the direction toward the front screw end. This front forming portion, conjointly with the configured thread that is also present here, serves for forming the periphery of the bore that is present. This of course primarily includes the configuration of the counter thread in the periphery of the bore. When viewed in the direction from the front screw end toward the screw head, a screw portion in which the shank is configured so as to be cylindrical, thus has a consistent cross section, then adjoins the front forming portion. At least one rib which intersects the screw thread is configured in the forming portion. This rib forms a type of counter thread to the screw thread, wherein said counter thread is configured only partially and incompletely. It has been surprisingly demonstrated that on account of this measure the sheet metal material is displaced parallel to the advancing direction of the screw and thus forms a screw-in collar, or passage protrusion, respectively. Depending on how long said screw-in collar is configured, said screw-in collar increases the holding force of the connection since there is more space for the counter thread and thus for the engagement of the screw thread in the counter thread. Depending on an orientation of the at least one rib in relation to the screw thread, the material is displaced only in the advancing direction or else counter to the advancing direction. The screw according to the invention is provided for screwing into ductile materials, in particular sheet metal, thus materials which are plastically deformed prior to failure, for example breakage.

In a refinement of the invention, the rib runs obliquely to the longitudinal axis.

in this manner, a displacement of material parallel to the advancing direction of the screw can be facilitated.

In a refinement of the invention, the rib runs in an orientation that is reverse to the orientation of the screw thread.

It can be achieved in this manner that a displacement of material is performed mainly in the advancing direction. When the screw is driven in, the surface that faces the screw head thus remains almost planar, and the screw-in collar, or passage protrusion, respectively, being created extends mainly in the advancing direction. A minimal displacement of material counter to the advancing direction always takes place at the beginning of the screw-in procedure. The surface that faces the screw head thus does not remain absolutely planar, but a minimal annular elevation is configured counter to the advancing direction.

In a refinement of the invention an angle (γ) between the rib and the screw thread is greater than 0° and smaller than 180°. As long as the at least one rib intersects the screw thread, a screw-in collar, or a passage protrusion, is formed. In the case of reversed orientation of the screw thread and of the rib, an angle of 55° between the screw axis and the rib has been demonstrated as particularly advantageous. Particularly advantageous effects of the rib are present at an angle between 40 and 70° to the screw axis in the case of a reversed orientation of the rib and the screw thread.

In a further design embodiment of the invention it can be provided that the rib forming the incomplete opposing thread runs so as to be steeper than the thread, for example at an angle of approximately 30 to 60 degrees in relation to the longitudinal axis of the screw.

It has been mentioned that the screw thread reaches to the front screw end, or begins directly at the front screw end, respectively. According to a further feature of the invention it can now be provided that the rib begins at an axial spacing from the front end, or the beginning, respectively, of the screw thread. A portion of the screw thread in which there is no rib is thus initially configured at the front end of the screw.

In a refinement of the invention it can be provided that the rib forming the incomplete counter thread ends ahead of the transition of the forming portion to the cylindrical portion of the shank, thus also has a spacing there. The mentioned displacement of the sheet metal material for forming the screw-in collar is no longer required or expedient, when the bore has already almost reached the final size thereof. It is therefore expedient to allow the rib to end at a spacing ahead of the beginning of the cylindrical portion of the shank.

It can be provided in a refinement, for example, that the rib extends across two to four thread turns of the screw thread.

It has been mentioned that the rib is a type of incompletely configured counter thread. According to a further feature it can also be provided that the height of the rib is smaller than the thread height of the thread, such that the thread has an uninterrupted, very pronounced thread edge. For example, the height of the rib is approximately half the size of the thread height of the screw thread.

The screw can have a continuous circular cross section. However, it is likewise possible and within the scope of the invention that said screw has a trilobular cross section, wherein the deviation from the circular shape can be dissimilar across the length of the screw shank. A trilobular screw shape is known from DE 10 2010 000 702, mentioned at the outset, reference being made thereto hereby, and the contents thereof being incorporated in the description by way of reference.

When the rib extends only across a short length of the screw shank, as is provided here as a possibility, it can be provided according to a further feature of the invention that a plurality of ribs of this type are provided, said ribs among one another being identically configured, for example, and disposed so as to be distributed uniformly across the circumference.

In a refinement of the invention the front screw end is rounded, in particular rounded so as to be hemispherical.

In a refinement of the invention the screw thread is configured as a sheet metal thread.

Further features, details, and merits of the invention are derived from the claims and from the abstract, the wording of both being incorporated in the content of the description by way of reference, from the following description of a preferred embodiment of the invention, and by means of the drawing. Individual features of the various embodiments herein can be combined in an arbitrary manner without departing from the scope of the invention.

BRIEF DESCRIPTION OF THE DRAWINGS

In the drawing:

FIG. 2 shows a schematic illustration of a thread-forming screw according to the prior art, together with the sectional view of a pre-bored component prior to and after driving in the thread-forming screw;

FIG. 3 shows a schematic illustration of the thread-forming screw according to the invention of FIG. 1, together with the sectional view of a pre-bored component prior to and after driving in the thread-forming screw; and FIG. 4 shows a schematic illustration of a thread-forming screw according to the invention, according to a further embodiment, together with the sectional view of a pre-bored component prior to and after driving in the thread-forming screw.

DETAILED DESCRIPTION

Figure 1:
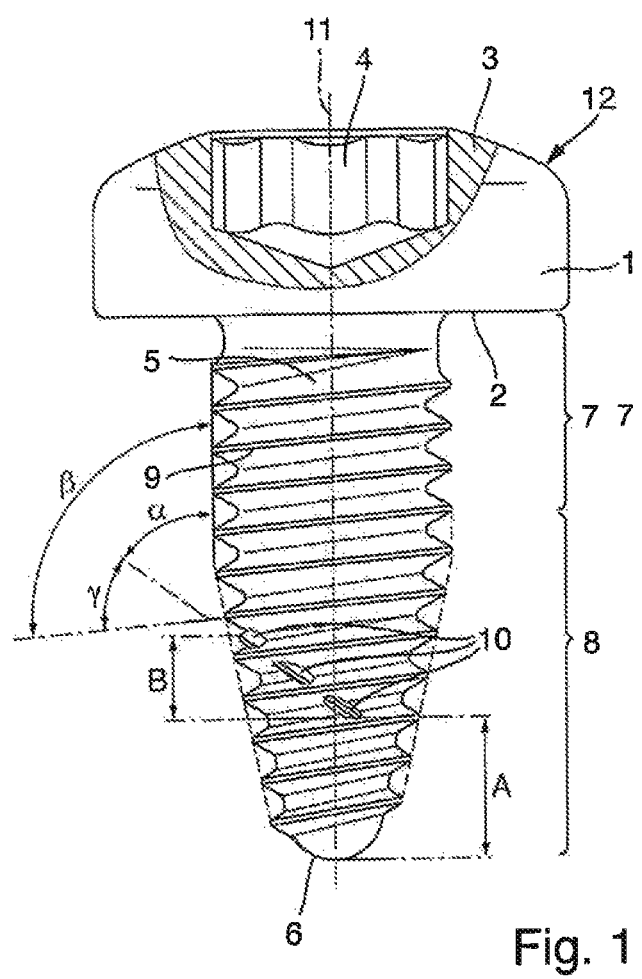
FIG. 1 shows a partially sectional lateral view of a screw according to the invention.

The screw illustrated in FIG. 1 contains a screw head 1 having a flat lower side 2. A screw-driving configuration 4 in the form of a depression, which is one of the usual configurations enabling a transmission of torque, is configured in the end side 3 that is opposite the flat lower side 2. The screw shank 5 extends from the lower side of the screw head 1 to a front end 6 which is configured so as to be rounded in an approximately hemispherical manner.

The screw shank 5 can be roughly subdivided into two portions, specifically a first cylindrical portion 7 that proceeds from the lower side 2 of the screw head 1, and a forming portion 8, adjoining the latter, in which the shank 5 has a continuously decreasing cross section and diameter. In the case of the embodiment illustrated and described, this portion 8 can also be referred to as being shaped in the manner of a truncated cone.

A screw thread 9 extends across the entire length of the shank 5, said screw thread 9 being configured continuously to the front screw end 6. The beginning of the screw thread 9 at the screw end 6 in the illustration of FIG. 1 herein is on that side of the shank 5 that faces away from the observer, and cannot be seen.

In the case of the embodiment illustrated, a rib 10 which extends across approximately three thread turns of the screw thread 9 is configured within the cone-shaped forming portion 8. The rib 10 runs in an orientation that is reversed in relation to the orientation of the screw thread 9. The thread 9 in the exemplary embodiment illustrated is a right-hand thread, while the rib 10 is disposed approximately in the manner of an incompletely configured left-hand thread.

The pitch of the thread formed by the rib 10 is significantly steeper than the pitch of the screw thread 9. The angle α between the longitudinal direction of the rib 10 and the longitudinal axis of the screw in the example illustrated is approximately degrees. The angle γ between the longitudinal direction of the rib 10 and the screw thread 9 is approximately 40 degrees. The angle β between the longitudinal axis of the screw and the screw thread 9 is approximately 95 degrees. The angle γ is the result of the difference between β and α.

When proceeding from the front screw end 6 and the beginning of the screw thread 9, the rib begins only at a spacing A from said front screw end 6 and ends ahead of the transition of the forming portion 8 to the cylindrical portion 7 of the screw shank 5. The axial length B of the region in which the rib 10 is present is smaller than the front rib-free portion A.

As can be likewise derived from the drawing, the height of the rib 10, that is to say the radial spacing of the external edge of said rib 10 from the thread groove of the screw thread 9, is smaller than the thread height of the screw thread. On account thereof, the thread edge of the thread 9 remains present in an undisturbed manner also in the region B.

FIG. 1 shows the screw seen from one side. An identical rib 10 can be present on the opposite side of the screw that is not visible in the figure.

The illustration of FIG. 2 shows a thread-forming screw 20 according to the prior art. It can be immediately seen that the screw thread of this screw 20 does not have any rib which cuts the screw thread.

FIG. 2 furthermore schematically shows a component 22 in which a prepared through opening 24a is provided. The thread-forming screw 20 is driven into the component 22, or into the through opening 24a, respectively.

FIG. 2 furthermore schematically shows the component 22 after screwing in the thread-forming screw 20. The through opening 24a has now been widened to a through opening 24b, the latter having a larger diameter, on the one hand, and a greater length, on the other hand. A passage protrusion 26 which proceeding from the original shape of the component 22 extends in the advancing direction of the screw 20 has been created by driving in the thread-forming screw 20.

However, the passage protrusion 26 is configured so as to be very short and specifically in the case of components 22 having a low material thickness cannot ensure a high resistance to overwinding the screw 20.

The illustration of FIG. 3 shows the thread-forming screw 12 according to the invention as has already been illustrated in FIG. 1. As has already been explained with reference to FIG. 1, the screw 12 has the rib 10 which extends in an orientation reverse to the screw thread 9 over approximately three thread turns of the screw thread 9.

FIG. 3 again shows the component 22 having the prepared through opening 24a.

FIG. 3 furthermore shows the component 22 once the thread-forming screw 12 according to the invention has been driven in. By driving in the thread-forming screw according to the invention, the through opening 24a has been widened to a through opening 24c, the latter in relation to the through opening 24a prior to driving in the screw having a larger diameter and also a greater length. Thus a passage protrusion 28 which in relation to the passage protrusion 26 of FIG. 2 has a significantly greater length has been generated by driving in the thread-forming screw according to the invention. In the case of the schematic illustration of FIG. 3, the length of the passage protrusion 28 is approximately the size of the material thickness of the component 22. The thread-forming screw according to the invention can thus be connected to the component 22 by way of significantly more thread turns, such that a very high resistance to overwinding the screw according to the invention, and also a significantly improved holding force in relation to the conventional screw is achieved.

The enlargement of the passage protrusion herein is created by the effect of the rib 10. When driving in the thread-forming screw according to the invention, the rib 10 displaces material in the region of the wall of the through opening 24a in the advancing direction, thus in a downward manner in FIG. 3. On account thereof, the passage protrusion 28 is elongated in relation to the passage protrusion 26 of FIG. 2.

The illustration of FIG. 4 shows a further thread-forming screw 30 according to the invention. In principle, the screw 30 is configured so as to be identical to the screw 12 according to the invention in FIG. 3, only a rib 32 being disposed not as is the case with the screw 12 in the reversed orientation to the screw thread 9, but in the same orientation as the screw thread 9. The rib 32 with a longitudinal axis of the screw 30 thus forms an angle of −55°.

When driving the screw 30 into the component 22, the through opening 24a on account thereof is not only enlarged in terms of the diameter of the latter, but a first passage protrusion 34 is formed on the lower side of the component 22 that faces away from the screw head, and also a second passage protrusion 36 is created on the side of the component 22 that faces the screw head 30. When driving in the screw 30, the rib 32 acts in a manner that material is displaced from the wall of the through opening 24a upward, counter to the advancing direction, such that the passage protrusion is formed. Surprisingly, however, the rib 32 simultaneously also ensures that the passage protrusion 34 is configured in the advancing direction, and that the passage protrusion 34 is indeed shorter than the passage protrusion 28 of FIG. 3, but still longer than the passage protrusion 26 of FIG. 2.

Specifically in the case of thin sheet metal, a significantly higher holding force and a significantly higher resistance to overwinding can thus be achieved compared with a conventional thread-forming screw 20 by way of the thread-forming screw 12 according to the invention of FIG. 1 and FIG. 3, as well as by way of the thread-forming screw 30 according to the invention of FIG. 4, since on account of the configuration of the passage protrusions 28, and 34, 36, respectively, more thread turns of the screw thread 9 engage in the component 32 once the screws 12, 30 according to the invention have been driven completely into the component 22.

Figure 5:
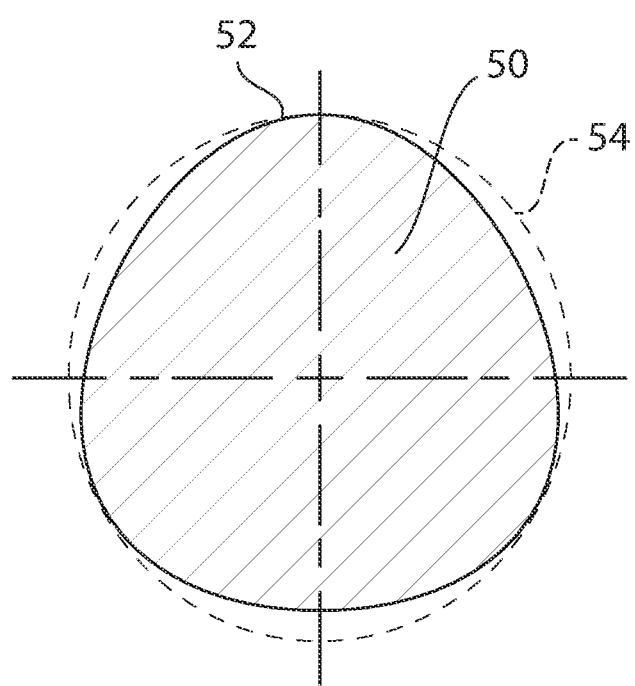
FIG. 5 shows a schematic illustration of a thread-forming screw according to the invention, according to a further embodiment.

The illustration of fig. 5 shows a further thread-forming screw 50 according to the invention. The screw 50 is configured to have a trilohular shank 52 below the screw head 54.

The invention claimed is:

1. A thread-forming screw for screwing into ductile materials comprising:
    a screw head including a screw-driving configuration;
    a screw shank which extends from the screw head to a front screw end, wherein the front screw end is rounded; and
    a screw thread,
    wherein a front forming portion of the screw shank has a cross section that decreases in the direction of the front screw end,
    wherein the screw thread reaches to the front screw end,
    wherein the screw thread is configured as a sheet metal thread and
    further wherein at least one rib which intersects the screw thread is configured in the forming portion, wherein the cross section of the screw shank has a trilobular shape.

2. The thread-forming screw as claimed in claim 1, wherein the rib runs obliquely to a longitudinal axis of the screw.

3. The thread-forming screw as claimed in claim 1, wherein the rib runs in an orientation that is reverse to the orientation of the screw thread.

4. The thread-forming screw as claimed in claim 1, wherein an angle ($\gamma$) between the rib and the screw thread is greater than 0 degrees and smaller than 180 degrees.

5. The thread-forming screw as claimed in claim 1, wherein the rib runs so as to be steeper than the screw thread.

6. The thread-forming screw as claimed in claim 1, wherein, when viewed in a direction from the front screw end toward the screw head, the rib begins at a spacing (A) from the beginning of the screw thread.

7. The thread-forming screw as claimed in claim 1, wherein, when viewed in a direction from the front screw end toward the screw head, the rib ends ahead of the transition of the forming portion to a cylindrical portion of the shank.

8. The thread-forming screw as claimed in claim 1, wherein the rib extends across two to four thread turns of the screw thread.

9. The thread-forming screw as claimed in claim 1, characterized in that a height of the rib is smaller than the height of the thread turns of the screw thread.

10. The thread-forming screw as claimed in claim 9, wherein a height of the rib is approximately half the size of the height of the thread turns of the screw thread.

11. The thread-forming screw as claimed in claim 1, wherein a plurality of obliquely running ribs that are preferably distributed uniformly across the circumference are provided.

* * * * *